United States Patent
Tenny et al.

(10) Patent No.: US 10,701,618 B2
(45) Date of Patent: Jun. 30, 2020

(54) SYSTEM AND METHOD FOR ACCESS BARRING

(71) Applicant: Futurewei Technologies, Inc., Plano, TX (US)

(72) Inventors: Nathan Edward Tenny, San Diego, CA (US); Da Wang, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/388,567

(22) Filed: Apr. 18, 2019

(65) Prior Publication Data

US 2019/0246333 A1 Aug. 8, 2019

Related U.S. Application Data

(62) Division of application No. 15/591,569, filed on May 10, 2017, now Pat. No. 10,292,087.

(60) Provisional application No. 62/453,062, filed on Feb. 1, 2017.

(51) Int. Cl.
*H04W 48/02* (2009.01)
*H04W 12/08* (2009.01)
*H04W 8/22* (2009.01)
*H04B 7/155* (2006.01)

(52) U.S. Cl.
CPC ........ *H04W 48/02* (2013.01); *H04B 7/15507* (2013.01); *H04B 7/15528* (2013.01); *H04W 8/22* (2013.01); *H04W 12/08* (2013.01)

(58) Field of Classification Search
CPC ....... H04W 48/02; H04W 24/08; H04W 8/22; H04W 12/08; H04B 7/15528; H04B 7/15507

USPC ......................................................... 455/434
See application file for complete search history.

(56) References Cited

U.S. PATENT DOCUMENTS

| | | | | |
|---|---|---|---|---|
| 9,215,626 | B2* | 12/2015 | Tenny | H04W 36/0022 |
| 2012/0117140 | A1* | 5/2012 | Wang | H04W 4/70 709/201 |
| 2013/0324114 | A1 | 12/2013 | Raghothaman et al. | |
| 2014/0080531 | A1 | 3/2014 | Du et al. | |
| 2015/0055447 | A1* | 2/2015 | Jamadagni | H04W 48/02 370/216 |
| 2016/0044727 | A1* | 2/2016 | Zisimopoulos | H04W 48/02 455/41.2 |

(Continued)

FOREIGN PATENT DOCUMENTS

| CN | 106162803 A | 11/2016 |
|---|---|---|
| WO | 2013136657 A1 | 9/2013 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 8)," 3GPP TS 36.331 V8.13.0, Mar. 2011, 213 pages.

(Continued)

*Primary Examiner* — Inder P Mehra
(74) *Attorney, Agent, or Firm* — Slater Matsil, LLP

(57) ABSTRACT

A method for performing access barring includes receiving barring parameters, modifying a subset of the barring parameters associated with an access class barring type, and forwarding the modified subset of the barring parameters to a remote device.

21 Claims, 6 Drawing Sheets

(56) References Cited

U.S. PATENT DOCUMENTS

| | | |
|---|---|---|
| 2017/0006447 A1 | 1/2017 | Bahta et al. |
| 2017/0251353 A1* | 8/2017 | Pinheiro ............... H04W 76/14 |
| 2018/0109985 A1 | 4/2018 | Huang et al. |
| 2018/0352412 A1 | 12/2018 | Huang et al. |
| 2019/0268827 A1* | 8/2019 | Kim ..................... H04W 48/08 |

FOREIGN PATENT DOCUMENTS

| | | |
|---|---|---|
| WO | 2016161745 A1 | 10/2016 |
| WO | 2017014716 A1 | 1/2017 |

OTHER PUBLICATIONS

Huawei, "Clarification on Access control for REAR", S1-170021, 3GPP TSG-SA WG1 #76bis, Spokane, WA, USA, Jan. 16-20, 2017, total 3 pages.

ZTE, "Discussion on the pairing, paging and system info acquisition of remote UE", R2-168170, 3GPP TSG-RAN WG2 Meeting #96, Reno, USA, Nov. 14-18, 2016, total 5 pages.

* cited by examiner

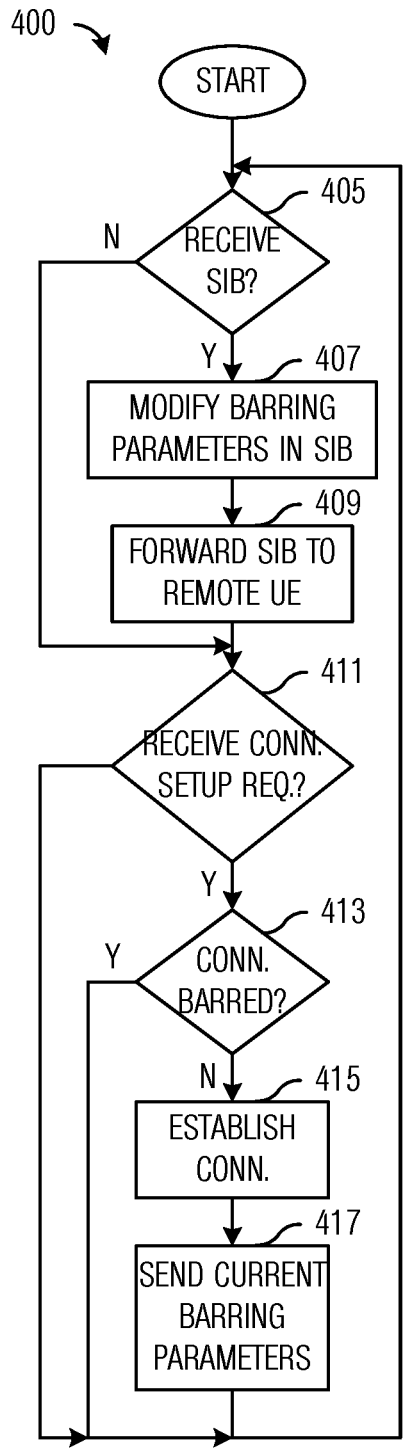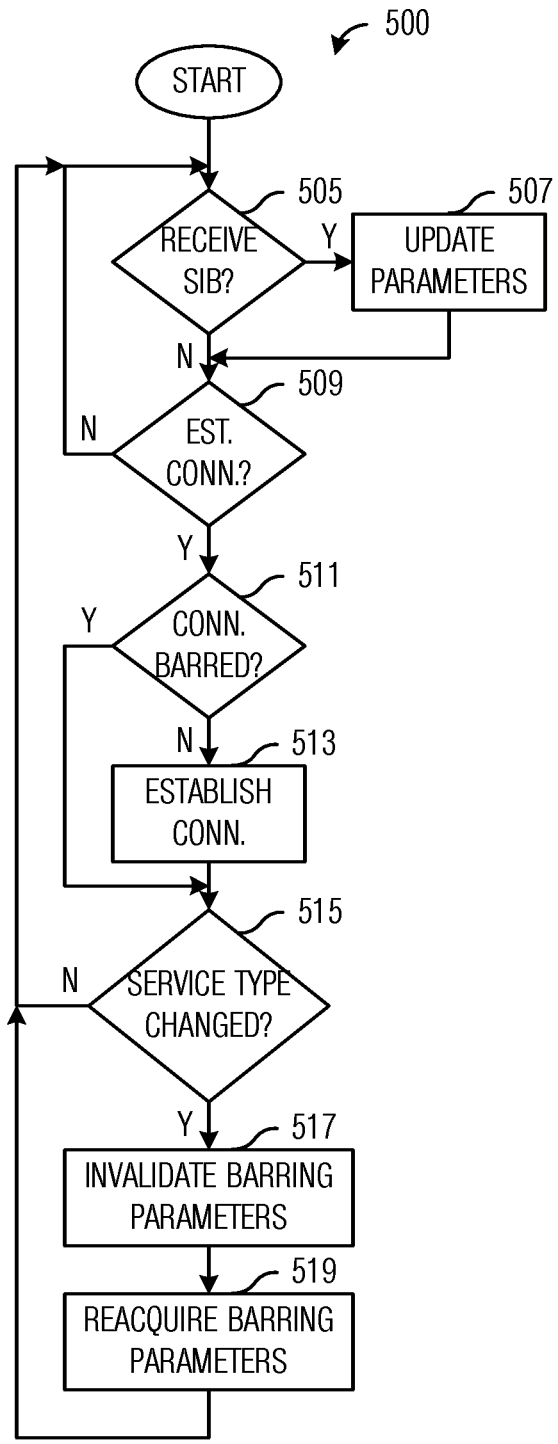
*Fig. 4*     *Fig. 5*

SYSTEM AND METHOD FOR ACCESS BARRING

This application is a divisional of U.S. patent application Ser. No. 15/591,569, filed on May 10, 2017, entitled "System and Method for Access Barring," which claims the benefit of U.S. Provisional Application No. 62/453,062, filed on Feb. 1, 2017, entitled "System and Method for Access Barring," all of which applications are hereby incorporated herein by reference in their entireties.

TECHNICAL FIELD

The present disclosure relates generally to a system and method for digital communications, and, in particular embodiments, to a system and method for access barring.

BACKGROUND

Access barring is a technique used in communications systems, such as those that are compliant to the Third Generation Partnership Project (3GPP) Long Term Evolution (LTE) technical standards, to control access to the communications systems by preventing devices from obtaining connections to the communications systems based upon the class of the devices or services that they seek. The communications systems may bar certain classes or services to prevent system overload in high congestion areas or times, or during emergencies.

SUMMARY

Example embodiments provide a system and method for access class barring.

In accordance with an example embodiment, a method for performing access barring is provided. The method includes receiving, by a relay device, barring parameters, modifying, by the relay device, a subset of the barring parameters associated with an access class barring type, and forwarding, by the relay device, the modified subset of the barring parameters to a remote device.

Optionally, in any of the preceding embodiments, wherein the access class barring type is a non-service related type.

Optionally, in any of the preceding embodiments, wherein the non-service related type comprises at least one of access class barring or enhanced access class barring.

Optionally, in any of the preceding embodiments, wherein the barring parameters are included in system information blocks.

Optionally, in any of the preceding embodiments, wherein at least a portion of the subset of the barring parameters are included in at least one of a system information block type 2 (SIB2) or a system information block type 14 (SIB14).

Optionally, in any of the preceding embodiments, wherein the subset of the barring parameters is included in the SIB2, and wherein modifying the subset of the barring parameters comprises setting an indication for at least one access class barring type to a false value.

Optionally, in any of the preceding embodiments, wherein the subset of the barring parameters is included in the SIB2, and wherein modifying the subset of the barring parameters comprises omitting a field including an indication for at least one connection type.

Optionally, in any of the preceding embodiments, wherein the subset of the barring parameters is included in the SIB14, and wherein modifying the subset of the barring parameters comprises setting a barring bitmap to indicate that the access class barring type is not barred.

Optionally, in any of the preceding embodiments, wherein modifying the subset of the barring parameters further includes omitting a per public land mobile network (PLMN) list of barring information.

In accordance with an example embodiment, a method for processing barring access information is provided. The method includes detecting, by a remote device, a change in service type, invalidating, by the remote device, barring parameters stored at the remote device, and reacquiring, by the remote device, current barring parameters.

Optionally, in any of the preceding embodiments, wherein the current barring parameters are reacquired from a network device.

Optionally, in any of the preceding embodiments, wherein the change in service type includes one of changing from an indirect connection to a direct connection, changing from a direct connection to an indirect connection, or changing a serving cell.

Optionally, in any of the preceding embodiments, wherein the current barring parameters are reacquired from a relay device when the remote device has an indirect connection and the current barring parameters are reacquired from an access node when the remote device has a direct connection.

In accordance with an example embodiment, a relay device adapted to perform access barring is provided. The relay device includes a processor, and a computer readable storage medium storing programming for execution by the processor. The programming including instructions to configure the relay device to receive barring parameters, modify a subset of the barring parameters associated with an access class barring type, and forward the modified subset of the barring parameters to a remote device.

Optionally, in any of the preceding embodiments, wherein the access class barring type is a non-service related type.

Optionally, in any of the preceding embodiments, wherein the non-service related type includes at least one of access class barring or enhanced access class barring.

Optionally, in any of the preceding embodiments, wherein the barring parameters are included in system information blocks.

Optionally, in any of the preceding embodiments, wherein at least a portion of the subset of the barring parameters are included in at least one of a system information block type 2 (SIB2) or a system information block type 14 (SIB14).

In accordance with an example embodiment, a remote device adapted to perform access barring is provided. The remote device includes a processor, and a computer readable storage medium storing programming for execution by the processor. The programming including instructions to configure the remote device to detect a change in service type, invalidate barring parameters stored at the remote device, and reacquire current barring parameters.

Optionally, in any of the preceding embodiments, wherein the current barring parameters are reacquired from a network device.

Optionally, in any of the preceding embodiments, wherein the change in service type includes one of changing from an indirect connection to a direct connection, changing from a direct connection to an indirect connection, or changing a serving cell.

Optionally, in any of the preceding embodiments, wherein the current barring parameters are reacquired from a relay device when the remote device has an indirect connection and the current barring parameters are reacquired from an access node when the remote device has a direct connection.

Practice of the foregoing embodiments enables the enforcement of access class barring type in a scenario with indirect (relayed) communications at either a remote device or a relay device based upon the class type.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates a flow diagram of example operations occurring in a relay UE participating connection establishment for a remote UE according to example embodiments described herein;

FIG. 5 illustrates a flow diagram of example operations occurring in a remote UE participating in establishing a connection with a relay UE according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
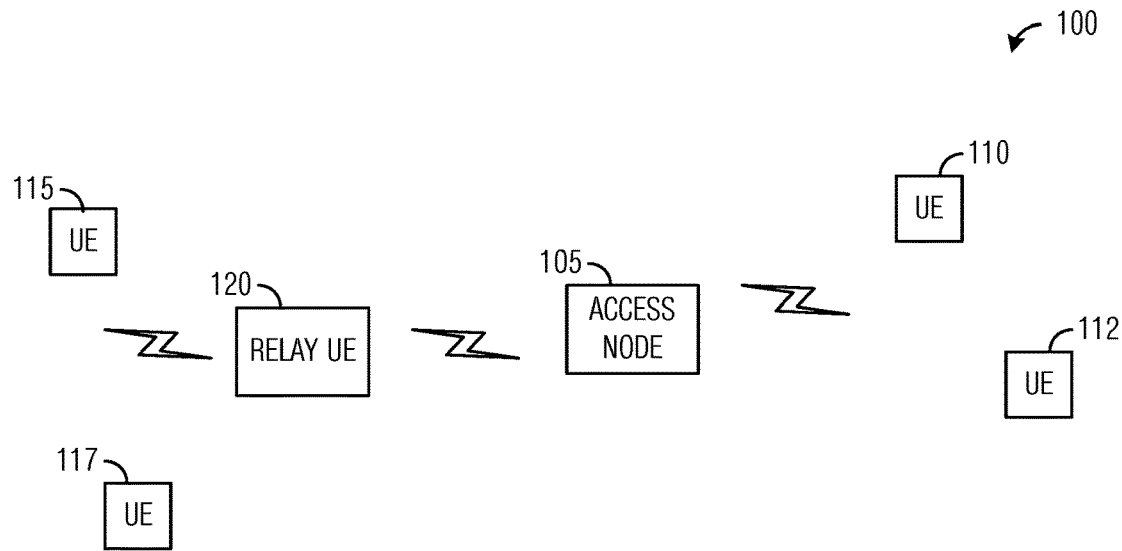
FIG. 1 illustrates an example wireless communications system according to example embodiments described herein.

FIG. 1 illustrates an example wireless communications system loft Wireless communications system 100 includes an access node 105 serving a plurality of user equipments (UEs), such as UE no and UE 112. In a first operating mode, communications to and from the UEs pass through access node 105. In a second operating mode, communications to and from the UEs do not pass through access node 105, however, access node 105 typically allocates resources used by the UEs to communicate.

When communications occur between access node and UE without going through an intermediary, the communications is referred to as direct communications. When communications pass through an intermediary while being exchanged between access node and UE, the communications is referred to as indirect communications. The intermediary is commonly referred to as a relay device, relay node, or simply relay. The relay device may be a dedicated device or a UE may serve as a relay device (referred to herein as a relay UE). As shown in FIG. 1, UEs 115 and 117 communicate with access node 105 (as well as other service providers) through relay UE 120. In addition to operating as a relay device, relay UE 120 may also be operating as a UE. Access nodes may also be commonly referred to as evolved NodeBs (eNBs), Next Generation (NG) NodeBs (gNBs), base stations, NodeBs, master eNBs (MeNBs), secondary eNBs (SeNBs), master gNBs (MgNBs), secondary gNBs (SgNBs), remote radio heads, access points, and the like, while UEs may also be commonly referred to as mobiles, mobile stations, terminals, subscribers, users, stations, and the like.

While it is understood that communications systems may employ multiple access nodes capable of communicating with a number of UEs, only one access node, one relay UE, and four UEs are illustrated for simplicity.

According to the Release 15 of the 3GPP LTE technical standards (3GPP LTE Rel-15), UE-to-network relaying is based on a Layer 2 relay architecture, where a remote UE (the UE being served by the relay UE) has radio resource control (RRC) and packet data convergence protocol (PDCP) layer connections end-to-end with the eNB, while lower protocol layers (such as radio link control (RLC), media access control (MAC), and physical (PHY) layers) are terminated by the relay UE. Transport between the remote UE and the relay UE may be 3GPP LTE sidelink communication using the PC5 interface or a non-3GPP access technology, such as IEEE 802.11 (Wi-Fi), Bluetooth, and so on.

Figure 2A:
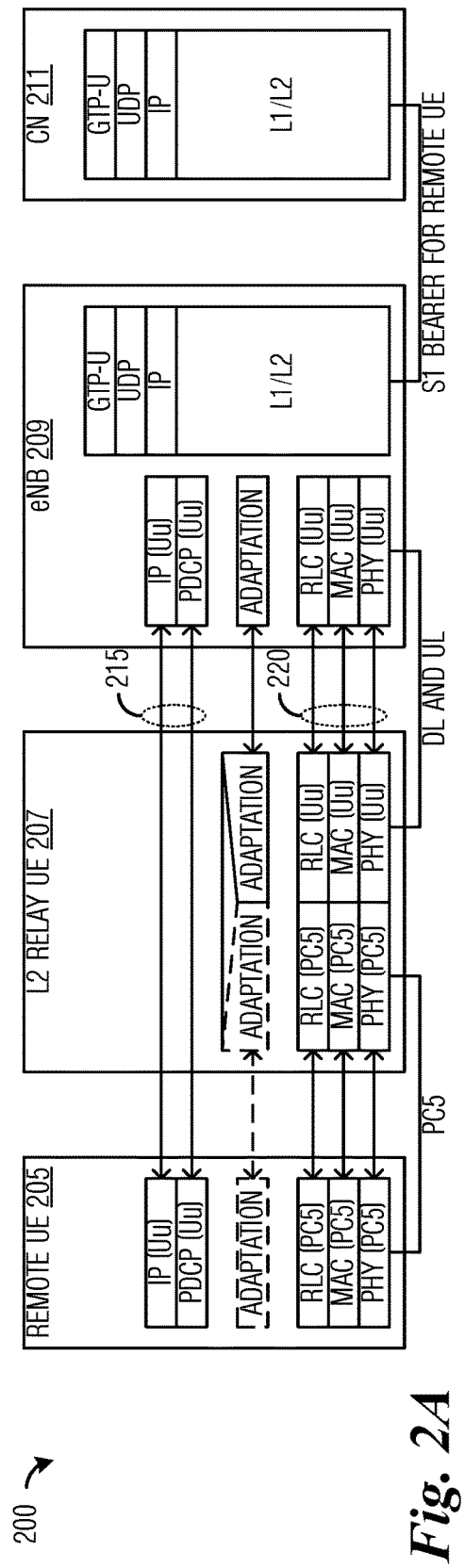
FIGS. 2A and 2B illustrate user plane stacks and control plane stacks of devices involved in UE-to-network relaying where PC5 provides transport between a remote UE and a relay UE.
Figure 2B:
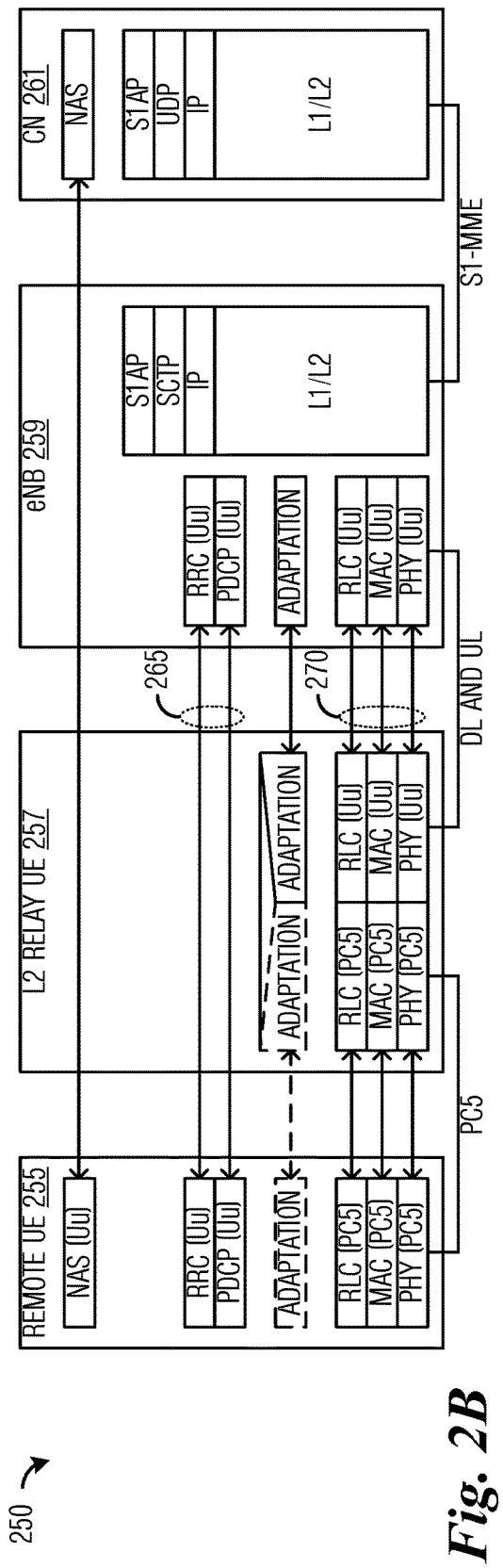

FIGS. 2A and 2B illustrate user plane stacks 200 and control plane stacks 250 of devices involved in UE-to-network relaying where PC5 provides transport between a remote UE and a relay UE. User plane stacks of a remote UE 205, a relay UE 207, an eNB 209, and a core network (CN) entity 211 are shown in FIG. 2A, while FIG. 2B displays control plane stacks of a remote UE 255, a relay UE 257, an eNB 259, and CN device 261. As shown in FIGS. 2A and 2B, end-to-end connections (highlights 215 and 265) exist between remote UE 205 (and remote UE 255) and eNB 209 (and eNB 259) for RRC and PDCP layers, while end-to-end connections (highlights 220 and 270) exist between relay UE 207 (and relay UE 257) and eNB 209 (and eNB 259) for RLC, MAC, and PHY layers.

With regard to the remote UE and the relay UE, the remote UE may be the RRC_IDLE state, while the relay UE may be in either the RRC_IDLE or RRC_CONNECTED states. When an idle remote UE wants to initiate a connection, the remote UE sends a signal (e.g., an RRCConnectionRequest message) to the relay UE, which forwards the signal to the network (e.g., an eNB). If the relay UE is also in the RRC_IDLE state, the relay UE will need to perform a random access procedure (e.g., a RACH procedure) to establish an RRC connection for itself before the relay UE can forward the signal to the network to start establishing the connection for the remote UE.

Figure 3:
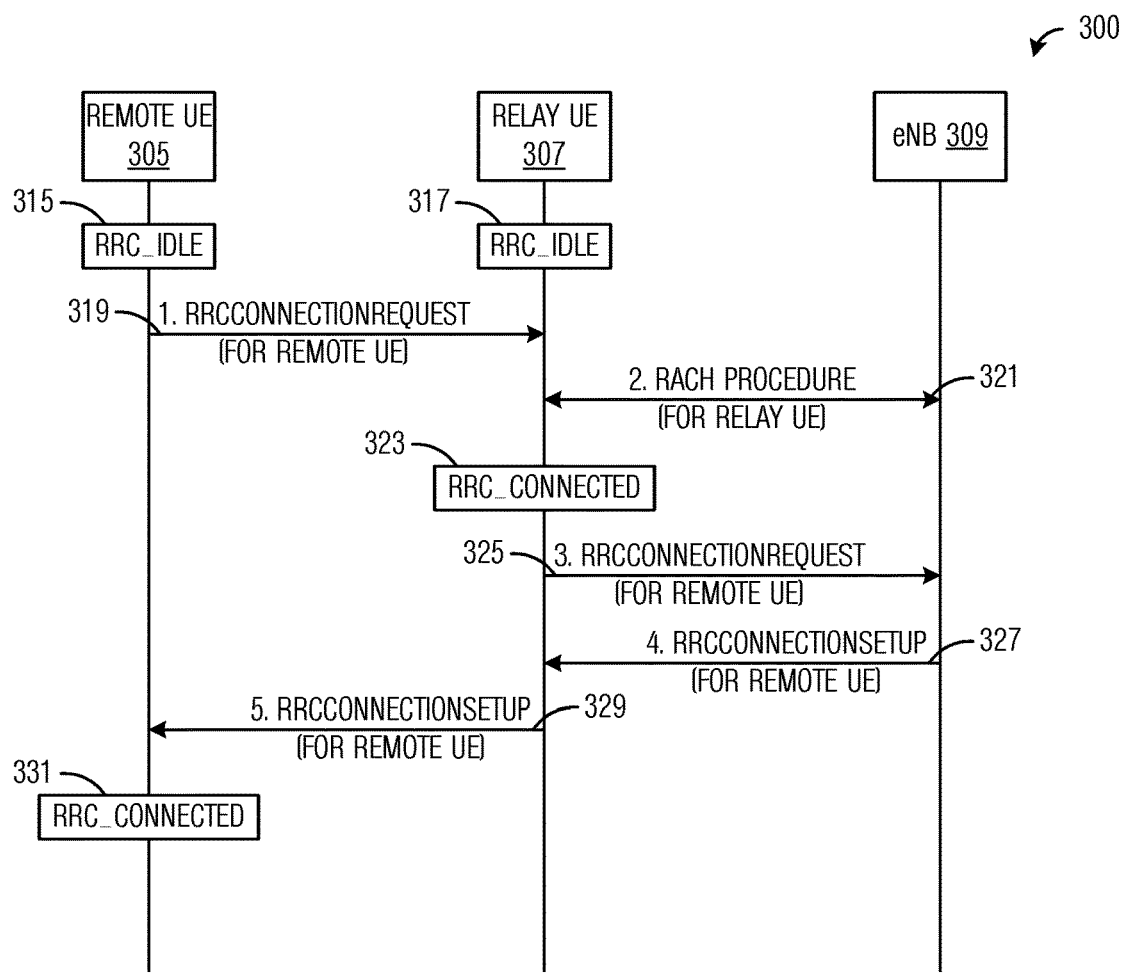
FIG. 3 illustrates a diagram of messages exchanged and processing performed by devices participating in the establishment of an indirect connection for a remote UE according to example embodiments described herein.

FIG. 3 illustrates a diagram 300 of messages exchanged and processing performed by devices participating in the establishment of an indirect connection for a remote UE. Diagram 300 displays messages exchanged and processing performed by a remote UE 305, a relay UE 307, and an eNB 309, participating in the establishment of an indirect connection for remote UE 305.

For discussion purposes, consider a situation wherein remote UE 305 and relay UE 307 are initially in the RRC_IDLE state (blocks 315 and 317). Remote UE 305 sends an RRCConnectionRequest message to relay UE 309 to initiate a connection (event 319). Because relay UE 307 is in the RRC_IDLE state, relay UE 307 performs a RACH procedure to establish a RRC connection for itself (event 321) and becomes RRC_CONNECTED (block 323). Once relay UE 307 is in the RRC_CONNECTED state, relay UE 307 forwards the RRCConnectionRequest message to eNB 309 to initiate the establishment of the connection for remote UE 305 (event 325). eNB 309 sends an RRCConnectionSetup message in response to the RRCConnectionRequest message to complete the establishment of the connection for remote UE 305 (event 327). Relay UE 307 forwards the RRCConnectionSetup message to remote UE 305 (block 329) and remote UE 305 becomes RRC_CONNECTED (block 331). Communications between remote UE 305 and eNB 309 may commence with relay UE 307 serving as intermediary.

As discussed previously, access barring is a technique that may be used in modern communications systems to control access to the communications systems by preventing devices from obtaining connections to the communications systems based upon the class of the devices. In 3GPP LTE, there are multiple types of barring:

Access Class Barring (ACB)—UEs of certain access classes are forbidden from using the RACH procedure to establish a connection. May be configured on a per public land mobile network (PLMN) basis in the situation where network sharing is implemented.

Enhanced ACB (EAB)—UEs are divided into categories as well as access classes. The barring is based on the categories as well as the classes. Different categories may have different barring configurations.

Service Specific Access Control (SSAC)—Video and/or voice services are barred selectively, by access class. SSAC is enforced in the upper layers of the protocol stack.

Application-specific Congestion control for Data Communications (ACDC)—Applications are barred selectively, by application class. Each class has its own barring parameters.

Circuit Switched FallBack (CSFB)—Separate configuration allows for the selective barring of cells from use for the CSFB procedure.

Due to the different types of barring, some barring is enforced based on the access class and/or other configuration parameters of the remote UE, while other barring is enforced based on parameters of the relay UE. As an example, service related barring (e.g., SSAC, ACDC, and CSFB) may be enforced based on the application(s) and service(s) running on the remote UE, while non-service related barring (e.g., ACB and EAB) may be enforced according to the access class and/or category of the relay UE.

According to an example embodiment, a system and method is provided that allows both the remote UE and the relay UE to use existing connection establishment procedures with suitable barring parameters to ensure that barring is performed according to the parameters of the appropriate UE (i.e., the remote UE or the relay UE) based on the barring type. The use of existing connection establishment procedures minimizes the impact on the technical standards, which will help accelerate acceptance and deployment.

According to an example embodiment, the relay UE modifies the barring parameters received from the network prior to forwarding the barring parameters to the remote UE. As an illustrative example, because the non-service related barring (e.g., ACB and EAB) is enforced by the relay UE and in accordance with the parameters of the relay UE, the remote UE should not consider ACB or EAB barring while the remote UE is performing the connection establishment procedure. One simple way to achieve this without modifying the connection establishment procedure is to have the relay UE modify the barring parameters so that the barring parameters associated with the barring type (e.g., ACB and/or EAB barring) are set so that the barring type is indicated as "not barred", independent of the actual values of the barring parameters related to the barring type. Similarly, because service related barring (e.g., SSAC, ACDC, and CSFB) is enforced by the remote UE, the relay UE should not consider SSAC, ACDC, or CSFB barring while the relay UE is performing the connection establishment procedure.

As related to the barring parameters, the relay UE selectively forwards the barring parameters. As an illustrative example, barring parameters related to ACB barring are included in SystemInformationBlock (SIB) Type 2 (SIB2). Generally, the forwarding of SIB2 by the relay UE would be a transparent forwarding process with the same PDCP protocol data units (PDUs) received on a Uu interface being forwarded on a PC5 or non-3GPP link to the remote UE (as shown in FIGS. 2A and 2B). However, SIB2 is transmitted by the network in a broadcast message, so processing of the message by the relay UE is needed in addition to forwarding; therefore, modification of the barring parameters related to ACB may require no special treatment of the message. The relay UE may, upon receipt of SIB2, modify the barring parameters related to ACB barring so that remote UEs receiving the modified SIB2 will not consider ACB barring when performing a barring procedure that is part of the connection establishment procedure. For example, barring parameters are modified so that the basic ACB information is always indicated as "not barred" for all fields. Barring parameters for other barring types (e.g., SSAC, ACDC, and CSFB) are forwarded intact.

The following fields in SIB2 may be modified:
ac-BarringInfo
    ac-BarringForEmergency is set to FALSE.
    ac-BarringForMO-Signaling and ac-BarringForMO-Data are omitted from the message.
ac-BarringPerPLMN-List-r12 is omitted from the message.

The modified SIB2 may then be re-encoded and forwarded to the remote UE. No special PDCP handling by the relay UE is needed because PDCP is transparent for the broadcast control channel (BCCH), on which the system information blocks are carried. The relay UE does need to call an abstract syntax notation one (ASN.1) encoding function for a downlink message.

As another illustrative example, barring parameters related to EAB barring are included in SIB Type 14 (SIB14). The processing of SIB14 by the relay UE is similar to the processing of SIB2. The relay UE may, upon receipt of SIB14, modify the barring parameters related to EAB barring so that remote UEs receiving the modified SIB14 will not consider EAB barring when performing a barring procedure that is part of the connection establishment procedure. For example barring parameters are modified so that the barring bitmap is zeroed out. Barring parameters for other barring types (e.g., SSAC, ACDC, and CSFB) are forwarded intact.

The following fields in SIB14 may need to be modified:
eab-BarringBitmap is set so all bits indicate "not barred".
eab-PerPLMN-List-r11 is omitted from the message.

As related to the establishment cause, the establishment cause is modified, as well as related implementation variables. The remote UE triggers the establishment of the connection by sending a signal (e.g., an RRCConnectionRequest message) to the relay UE with a normal establishment cause value (e.g., if the remote UE is establishing the connection to support a mobile originated voice call, then the establishment cause value indicates a mobile originated voice call). In the connection request message sent by the relay UE (if any), however, the establishment cause value may be modified relative to the establishment cause value sent by the remote UE. As an example, if the relay UE needs to establish an RRC connection for itself, the relay UE may consider that the cause is "mobile originated data", not affected by the establishment cause or related information from the remote UE. Alternatively, the relay UE may consider that the cause is "mobile originated signaling". This may be dependent on if the forwarded RRCConnectionRequest message is considered to be signaling because it is a control message for the remote UE or data because it is simply something from the remote UE to be forwarded by the relay UE. The answer may depend upon whether the forwarded RRCConnectionRequest message is carried in a data radio bearer (DRB) or a signaling radio bearer (SRB). Both options are supported in the example embodiments presented herein.

The barring procedure that is part of the connection establishment procedure is performed by both the remote UE and the relay UE. However, due to the modification of the barring parameters by the relay UE, the barring parameters used in the barring procedure by the two UEs are different. In other words, a different model of the purpose for which the connection is being established is used at the two UEs.

As related to remote UE behavior, when the remote UE comes from the RRC_IDLE state, the remote UE initiates its connection by sending a connection setup request (e.g., an RRCConnectionRequest message) to the relay UE for forwarding. The connection setup request includes an establishment cause (legacy behavior) and there is no indication of the access class of the remote UE.

When the remote UE sends the connection setup request, the remote UE applies the barring procedure. ACB and EAB will always pass because the modified barring parameters indicates that ACB and EAB barring is not active. The checks for SSAC, ACDC, and CSFB barring uses existing barring parameters without modification. In general, there is no change to existing remote UE barring procedure.

According to an example embodiment, when a remote UE changes connection type (e.g., changing from an indirect connection (a relayed connection) to a direct connection (a relayless connection), or vice versa), the remote UE invalidates the barring parameters associated with non-service related barring (e.g., ACB and EAB in SIB2 and SIB14 respectively) and reacquires any needed system information messages to obtain current values of the barring parameters. If the barring parameters are not reacquired, the remote UE would incorrectly apply the modified barring parameters while in a direct connection or unmodified barring parameters in an indirect connection and improperly handle the non-service related barring types. As an example, if the remote UE changed from an indirect connection to a direct connection without reacquiring the barring parameters, the remote UE may improperly bypass the non-service related barring types. As another example, if the remote UE changed from a direct connection to an indirect connection without reacquiring the barring parameters, the remote UE may bar non-service related barring types when they should be passed. According to an embodiment, the relay UE forwards the barring information related to the non-service related barring to the remote UE upon establishing an indirect path for the remote UE. Other events, such as change in barring parameters, newly received SIBs, change in cell, and so on, may also trigger the relay UE to forward barring information related to the non-service related barring to the remote UE.

As related to relay UE behavior, if the relay UE is also in RRC_IDLE state, the relay UE performs a random access procedure (e.g., a RACH procedure) and establishes its own RRC connection. The random access procedure includes the relay UE sending a connection setup request, e.g., an RRCConnectionRequest message, for itself. The "establishmentCause" field of the RRCConnectionRequest message is always set to "mo-Data", because from the perspective of the relay UE, the relay UE is only relaying data provided by the remote UE in a transparent manner. Hence, for the relay UE, the connection being established is a mobile data connection. When the RRCConnectionRequest message from the remote UE is forwarded, the forwarded RRCConnectionRequest message includes the original establishmentCause. Therefore, the eNB has the opportunity to consider the connection of the remote UE and determine if it will allow establishment of the connection, including taking the cause value into consideration.

As related to ACB and/or EAB behavior, the existing ACB and/or EAB behavior applies, using the same access class of the relay UE and the ACB/EAB parameters as signaled in the SIB.

FIG. 4 illustrates a flow diagram of example operations 400 occurring in a relay UE participating connection establishment for a remote UE. Operations 400 may be indicative of operations occurring in a relay UE as the relay UE participates in connection establishment for a remote UE. It is noted that although the discussion focuses on a relay UE, operations 400 may also be applicable to a generic relay device and not just a UE operating as a relay.

Operations 400 begin with the relay UE performing a check to determine if it has received a SIB including barring parameters to be modified (block 405). If the SIB does include barring parameters to be modified, e.g., SIB2 and/or SIB14, the relay UE modifies the barring parameters in the SIB (block 407). As an illustrative example, the relay UE modifies the barring parameters that are related to an access class barring type ACB and/or EAB. The relay UE forwards the modified SIB to the remote UE (block 409).

The relay UE also performs a check to determine if it has received a connection setup request from the remote UE (block 411). The connection setup request may be in the form of an RRCConnectionRequest message from the remote UE. If the relay UE has received the connection setup request from the remote UE, the relay UE performs a check to determine if the connection is barred (block 419). As an example, the check to determine if the connection is barred involves the relay UE checking the barring parameters. If the connection is not barred, the relay UE participates in establishing the connection for the remote UE (block 415). The relay UE may forward the RRCConnectionRequest message to an eNB, for example. The relay UE may also receive an RRCConnectionSetup message from the eNB, which it may forward to the remote UE. The relay UE sends current barring parameters, especially the modified barring parameters to the remote UE (block 417). If the connection is barred, the relay UE does not participate in establishing the connection for the remote UE. The relay UE may indicate to the remote UE that the connection has been barred. The relay UE may return to block 405 to determine if it has received a SIB that includes barring parameters to be modified. Alternatively, the relay may return to block 411 to determine if it has received a connection setup request.

FIG. 5 illustrates a flow diagram of example operations 500 occurring in a remote UE participating in establishing a connection with a relay UE. Operations 500 may be indicative of operations occurring in a remote UE as the remote UE participates in establishing a connection with a relay UE.

Operations 500 begin with the remote UE performing a check to determine if it has received a SIB including barring parameters (block 505). If the remote UE has received a SIB with barring parameters, the remote UE updates its barring parameters in accordance with information in the SIB.

The remote UE performs a check to determine if it has to establish a connection (block 509). If the remote UE has to establish a connection, the remote UE performs a check to determine if the connection is barred (block 511). The UE may check to determine if the connection is barred by performing a barring procedure to check the barring parameters. If the connection is not barred, the remote UE establishes the connection (block 513). The remote UE may establish the connection by sending a connection setup request, e.g., an RRCConnectionRequest message, to a relay UE. If the connection is barred, the remote UE does not establish the connection.

The remote UE performs a check to determine if the service type has changed since the barring parameters were acquired (block 515). If the service type has changed, the remote UE invalidates barring parameters (block 517) and reacquires current barring parameters (block 519). The changed service type may make the barring parameters stored at the remote UE invalid, hence the remote UE should reacquire the barring parameters. Examples of changed service types include changed connections (indirect to direct connections and vice versa), changed cells, and so on. Reacquiring the barring parameters may comprise receiving the barring parameters from the relay UE, e.g., in a situation when the remote UE is engaged in indirect communications with the eNB and the relay UE is serving as an intermediary. Alternatively, reacquiring the barring parameters may comprise receiving the barring parameters directly from the eNB, e.g., in a situation when the remote UE is engaged in direct communications with the eNB.

Figure 6:
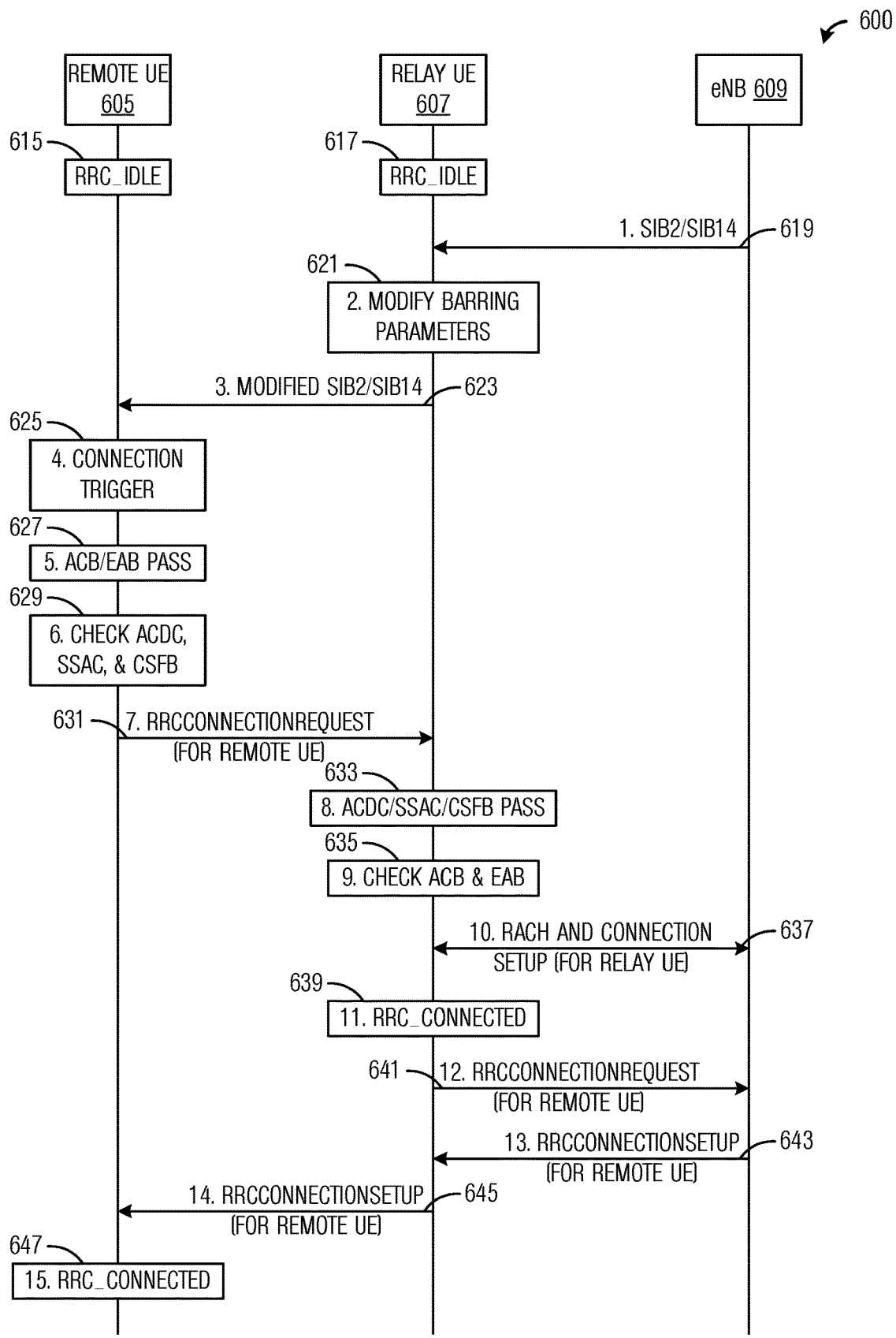
FIG. 6 illustrates a diagram of messages exchanged and processing performed by devices participating in the establishment of an indirect connection for a remote UE with modified barring information according to example embodiments described herein.

FIG. 6 illustrates a diagram 600 of messages exchanged and processing performed by devices participating in the establishment of an indirect connection for a remote UE with modified barring information. Diagram 600 displays messages exchanged and processing performed by a remote UE 605, a relay UE 607, and an eNB 609, participating in the establishment of an indirect connection for remote UE 605.

For discussion purposes, consider a situation wherein remote UE 605 and relay UE 607 are initially in the RRC_IDLE state (blocks 615 and 617). eNB 609 either updates barring information or periodically transmits barring information in the form of SIBs, e.g., SIB2 and/or SIB14 (event 619). Relay UE 607 receives the SIBs and modifies the barring information related to non-service related barring types (e.g., ACB and EAB) (block 621) and forwards the modified SIBs to remote UE 605 (event 623).

At remote UE 605, events occur that trigger the need for a connection (block 625). As an example, data is generated at remote UE 605 that has to be transmitted to another device, an application is launched at remote UE 605 that requires a connection, and so on. Remote UE 605 performs a barring check procedure, which includes automatically passing the non-service barring types due to the modified barring parameters (block 627) and checking the barring parameters for the service barring types (e.g., ACDC, SSAG, and CSFB) (block 629). The non-service barring types (e.g., ACB and EAB) always pass and the barring check is not meaningful because the barring parameters that control it are modified prior to remote UE 605 receiving them. The service specific barring types use the same barring parameters as normal. If the connection is not barred, remote UE 605 sends a connection setup request (e.g., an RRCConnectionRequest message) to relay UE 607 (event 631).

Relay UE 607 also performs a barring procedure, which includes automatically passing the service specific barring types (block 633) and checking the barring parameters for the non-service barring types (block 635). Relay UE 607 checks non-service barring types using its own access class because relay UE 607 is the device actually occupying the physical random access channel (PRACH). As for the service barring types, SSAC always passes because relay UE 607 does not consider that it is the device connecting for voice and/or video, ACDC always passes unless relay UE 607 has itself been given an ACDC class for the relaying application (in such a situation, it is correct for relay UE 607 to perform the ACDC barring check in this manner, independent of the remote UE), and CSFB always passes because relay UE 607 does not consider that it is the device connecting for CSFB. If the connection is not barred, relay UE 607 establishes a connection for itself by performing a random access procedure and sends a connection setup message (event 637). Once the connection is established, relay UE 607 is in the RRC_CONNECTED state (block 639) and relay UE 607 forwards the connection setup request for remote UE 605 to eNB 609 (event 641). Relay UE 607 receives a connection setup response from eNB 609 (event 643). The connection setup response may be an RRCConnectionSetup message. Relay UE 607 forwards the connection setup response to remote UE 605 (event 645) and remote UE 605 enters the RRC_CONNECTED state upon receipt of the connection setup response (block 647).

In a first aspect, the present application provides a method for performing access barring. The method includes receiving, by a relay device, barring parameters, modifying, by the relay device, a subset of the barring parameters associated with an access class barring type, and forwarding, by the relay device, the modified subset of the barring parameters to a remote device.

According to a first embodiment of the method according to the first aspect, the access class barring type is a non-service related type. According to a second embodiment of the method according to any preceding embodiment of the first aspect or the first aspect as such, the non-service related type comprises at least one of access class barring or enhanced access class barring. According to a third embodiment of the method according to any preceding embodiment of the first aspect or the first aspect as such, the barring parameters are included in system information blocks.

According to a fourth embodiment of the method according to any preceding embodiment of the first aspect or the first aspect as such, at least a portion of the subset of the barring parameters are included in at least one of a system information block type 2 (SIB2) or a system information block type 14 (SIB14). According to a fifth embodiment of the method according to any preceding embodiment of the first aspect or the first aspect as such, the subset of the barring parameters is included in the SIB2, and wherein modifying the subset of the barring parameters comprises setting an indication for at least one access class barring type to a false value. According to a sixth embodiment of the method according to any preceding embodiment of the first aspect or the first aspect as such, the subset of the barring parameters is included in the SIB2, and wherein modifying the subset of the barring parameters comprises omitting a field including an indication for at least one connection type. According to a seventh embodiment of the method according to any preceding embodiment of the first aspect or the first aspect as such, the subset of the barring parameters is included in the SIB14, and wherein modifying the subset of the barring parameters comprises setting a barring bitmap to indicate that the access class barring type is not barred.

According to an eighth embodiment of the method according to any preceding embodiment of the first aspect or the first aspect as such, modifying the subset of the barring parameters further includes omitting a per public land mobile network (PLMN) list of barring information.

In a second aspect, the present application provides a method for processing barring access information. The method includes detecting, by a remote device, a change in service type, invalidating, by the remote device, barring parameters stored at the remote device, and reacquiring, by the remote device, current barring parameters.

According to a first embodiment of the method according to the second aspect, the current barring parameters are reacquired from a network device. According to a second embodiment of the method according to any preceding embodiment of the second aspect or the second aspect as such, the change in service type includes one of changing from an indirect connection to a direct connection, changing from a direct connection to an indirect connection, or changing a serving cell. According to a third embodiment of the method according to any preceding embodiment of the second aspect or the second aspect as such, the current barring parameters are reacquired from a relay device when the remote device has an indirect connection and the current barring parameters are reacquired from an access node when the remote device has a direct connection.

In a third aspect, the present application provides a relay device adapted to perform access barring. The relay device includes a processor, and a computer readable storage medium storing programming for execution by the processor. The programming including instructions to configure the relay device to receive barring parameters, modify a subset of the barring parameters associated with an access class barring type, and forward the modified subset of the barring parameters to a remote device.

According to a first embodiment of the relay device according to the third aspect, the access class barring type is a non-service related type. According to a second embodiment of the relay device according to any preceding embodiment of the third aspect or the third aspect as such, the non-service related type includes at least one of access class barring or enhanced access class barring. According to a third embodiment of the relay device according to any preceding embodiment of the third aspect or the third aspect as such, the barring parameters are included in system information blocks. According to a fourth embodiment of the relay device according to any preceding embodiment of the third aspect or the third aspect as such, at least a portion of the subset of the barring parameters are included in at least one of a system information block type 2 (SIB2) or a system information block type 14 (SIB14).

In a fourth aspect, the present application provides a remote device adapted to perform access barring. The remote device includes a processor, and a computer readable storage medium storing programming for execution by the processor. The programming including instructions to configure the remote device to detect a change in service type, invalidate barring parameters stored at the remote device, and reacquire current barring parameters.

According to a first embodiment of the remote device according to the fourth aspect, the current barring parameters are reacquired from a network device. According to a second embodiment of the remote device according to any preceding embodiment of the fourth aspect or the fourth aspect as such, the change in service type includes one of changing from an indirect connection to a direct connection, changing from a direct connection to an indirect connection, or changing a serving cell. According to a third embodiment of the remote device according to any preceding embodiment of the fourth aspect or the fourth aspect as such, the current barring parameters are reacquired from a relay device when the remote device has an indirect connection and the current barring parameters are reacquired from an access node when the remote device has a direct connection.

Figure 7:
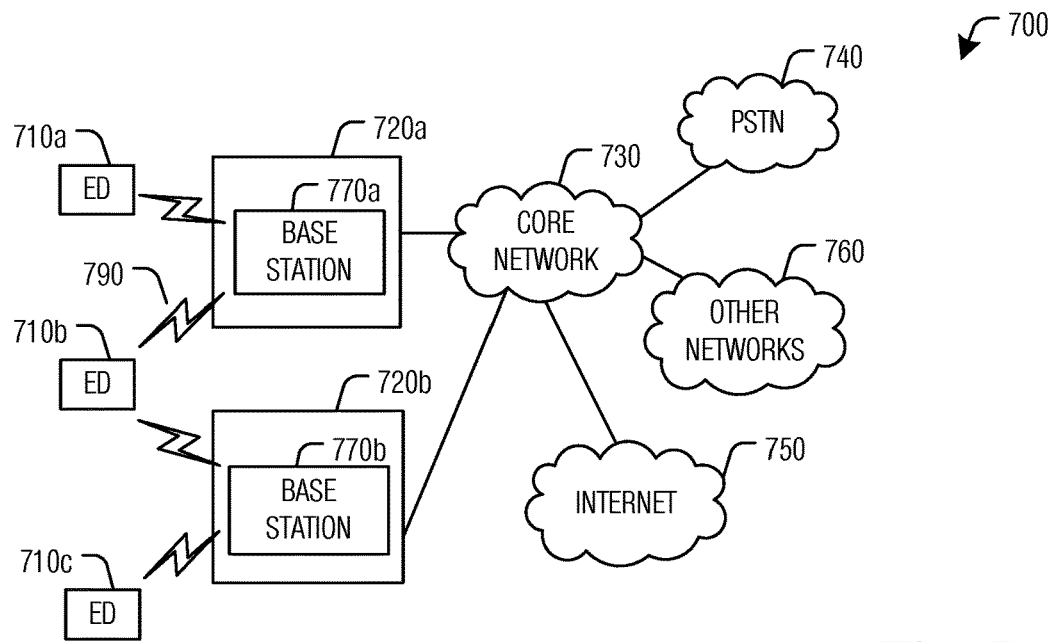
FIG. 7 illustrates an example communication system according to example embodiments described herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 700 includes electronic devices (ED) 710a-710c, radio access networks (RANs) 720a-720b, a core network 730, a public switched telephone network (PSTN) 740, the Internet 750, and other networks 760. While certain numbers of these components or elements are shown in FIG. 7, any number of these components or elements may be included in the system 700.

The EDs 710a-710c are configured to operate and/or communicate in the system 700. For example, the EDs 710a-710c are configured to transmit and/or receive via wireless or wired communication channels. Each ED 710a-710c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 720a-720b here include base stations 770a-770b, respectively. Each base station 770a-770b is configured to wirelessly interface with one or more of the EDs 710a-710c to enable access to the core network 730, the PSTN 740, the Internet 750, and/or the other networks 760. For example, the base stations 770a-770b may include (or be) one or more of several well-known devices, such as a base transceiver station (BTS), a Node-B (NodeB), eNB, a Home NodeB, a Home eNodeB, a site controller, an access point (AP), or a wireless router. The EDs 710a-710c are configured to interface and communicate with the Internet 750 and may access the core network 730, the PSTN 740, and/or the other networks 760.

In the embodiment shown in FIG. 7, the base station 770a forms part of the RAN 720a, which may include other base stations, elements, and/or devices. Also, the base station 770b forms part of the RAN 720b, which may include other base stations, elements, and/or devices. Each base station 770a-770b operates to transmit and/or receive wireless signals within a particular geographic region or area, sometimes referred to as a "cell." In some embodiments, multiple-input multiple-output (MIMO) technology may be employed having multiple transceivers for each cell.

The base stations 770a-770b communicate with one or more of the EDs 710a-710c over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 720a-720b are in communication with the core network 730 to provide the EDs 710a-710c with voice, data, application, Voice over Internet Protocol (VoIP), or other services. Understandably, the RANs 720a-720b and/or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710a-710c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
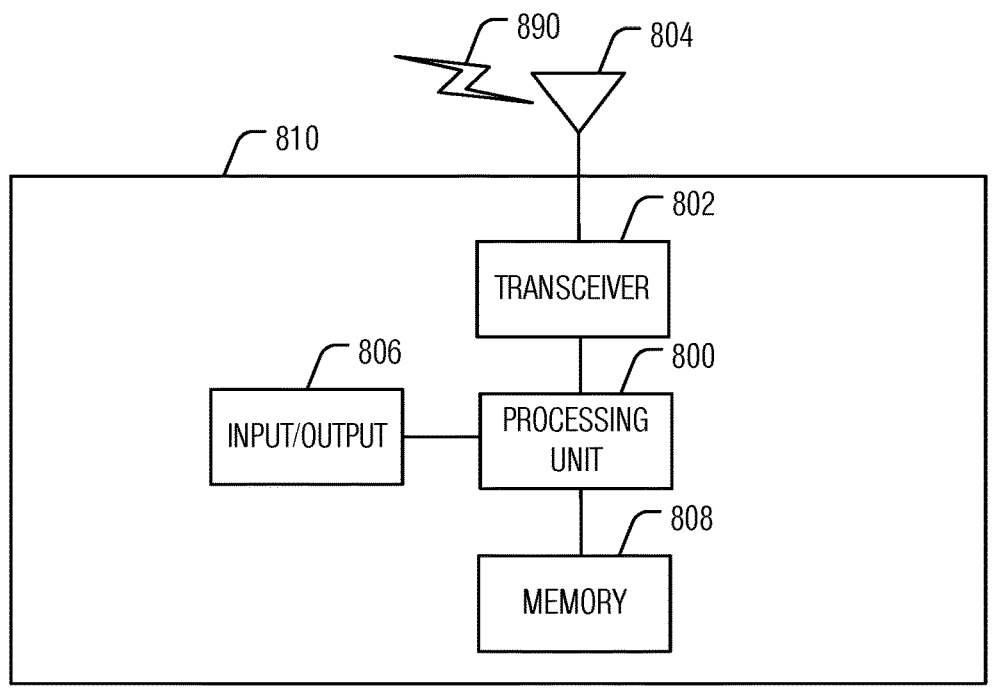
FIGS. 8A and 8B illustrate example devices that may implement the methods and teachings according to this disclosure.
Figure 8B:
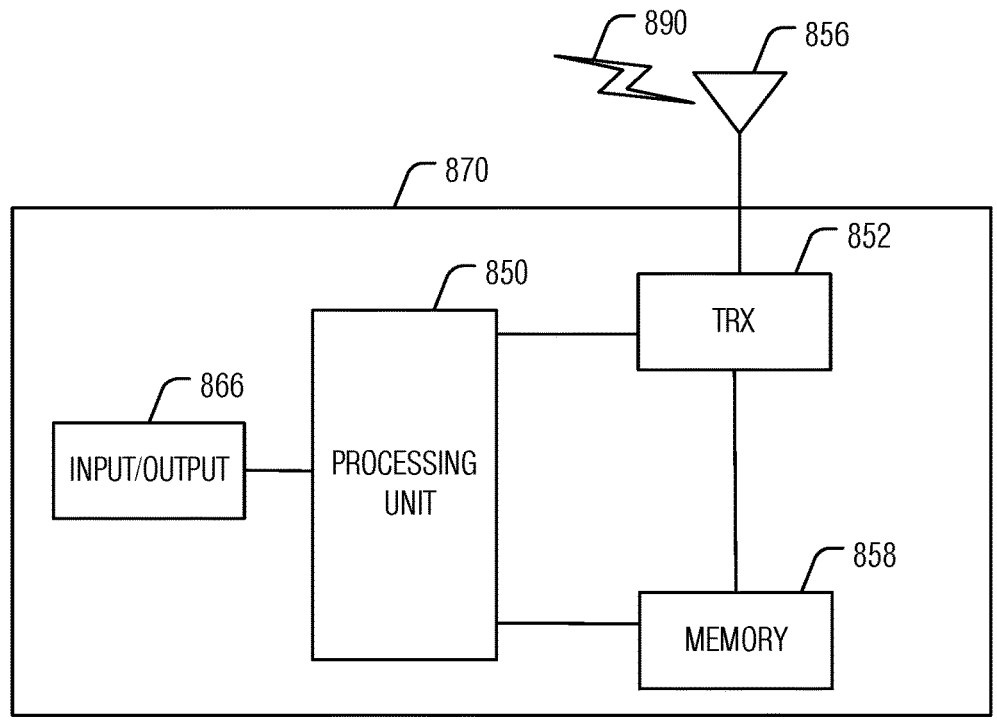

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED 810 includes at least one processing unit 800. The processing unit 800 implements various processing operations of the ED 810. For example, the processing unit 800 could perform signal coding, data processing, power control, input/output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 800 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission and/or processing signals received wirelessly or by wire. Each antenna 804 includes any suitable structure for transmitting and/or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input/output devices 806 or interfaces (such as a wired interface to the Internet 750). The input/output devices 806 facilitate interaction with a user or other devices (network communications) in the network. Each input/output device 806 includes any suitable structure for providing information to or receiving/providing information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input/output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input/output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting and/or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile and/or non-volatile storage and retrieval device(s). Each input/output device 866 facilitates interaction with a user or other devices (network communications) in the network. Each input/output device 866 includes any suitable structure for providing information to or receiving/providing information from a user, including network interface communications.

Figure 9:
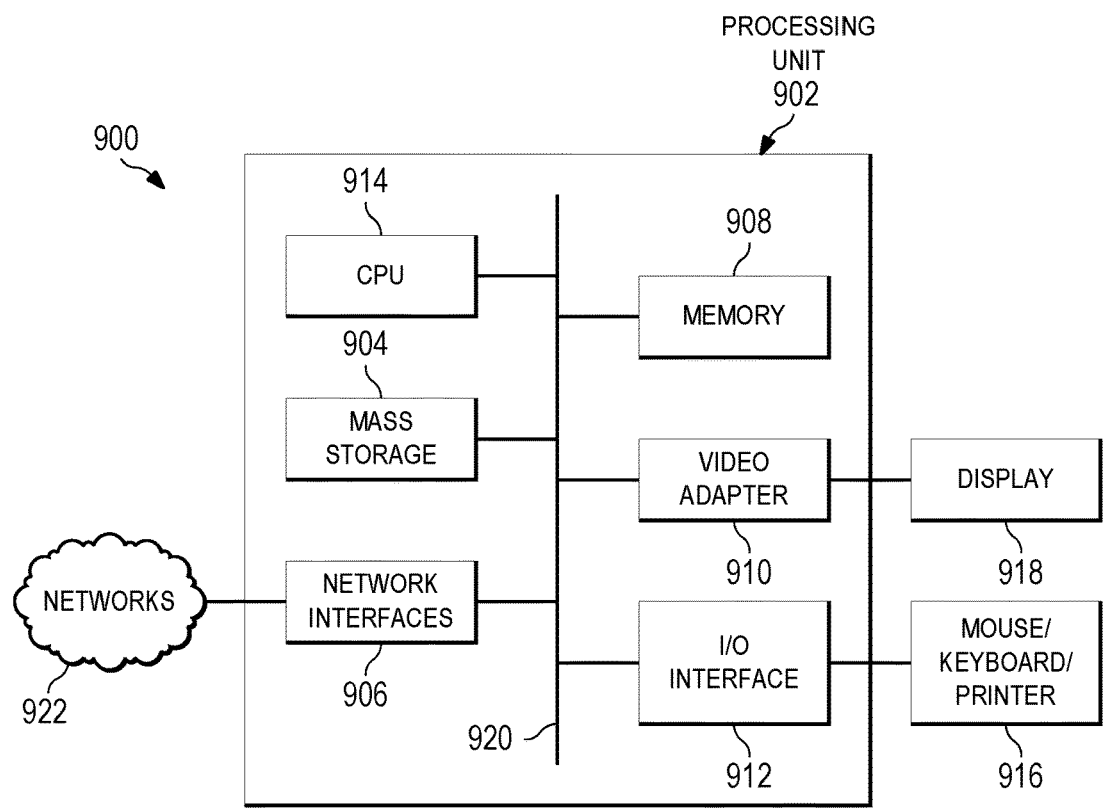
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse/keyboard/printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, and/or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a modifying unit/module, a forwarding unit/module, a setting unit/module, an omitting unit/module, a detecting unit/module, an invalidating unit/module, and/or a reacquiring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for performing access barring, the method comprising:
   receiving, by a relay device from a network element, barring parameters;
   modifying, by the relay device, a non-service-related subset of the barring parameters associated with an access class barring type, and leaving unmodified a service-related subset of the barring parameters;
   forwarding, by the relay device to a remote device, the modified non-service-related subset of the barring parameters and the unmodified service-related subset of the barring parameters;
   receiving, by the relay device from the remote device, a connection setup request;
   passing without checking, by the relay device, any remote device service-related barring types;
   comparing, by the relay device, one or more relay device access class barring types against the non-service-related subset of the barring parameters as received from the network element; and
   determining, by the relay device, whether to establish a connection with the network element in accordance with the comparison.

2. The method of claim 1, wherein the one or more relay device access class barring types comprise at least one of access class barring or enhanced access class barring.

3. The method of claim 1, wherein the barring parameters are included in system information blocks.

4. The method of claim 3, wherein at least a portion of the non-service-related subset of the barring parameters are included in at least one of a system information block type 2 (SIB2) or a system information block type 14 (SIB14).

5. The method of claim 4, wherein the non-service-related subset of the barring parameters is included in the SIB2, and modifying the non-service-related subset of the barring parameters comprises setting an indication for at least one access class barring type to a false value.

6. The method of claim 4, wherein the non-service-related subset of the barring parameters is included in the SIB2, and modifying the non-service-related subset of the barring parameters comprises omitting a field including an indication for at least one connection type.

7. The method of claim 4, wherein the non-service-related subset of the barring parameters is included in the SIB14, and modifying the non-service-related subset of the barring parameters comprises setting a barring bitmap to indicate that the access class barring type is not barred.

8. The method of claim 7, wherein modifying the non-service-related subset of the barring parameters further comprises omitting a per public land mobile network (PLMN) list of barring information.

9. The method of claim 1, wherein the any remote device service-related barring types comprises at least one of service specific access control, application-specific congestion control for data communications, or circuit switched fallback.

10. A relay device adapted to perform access barring, the relay device comprising:
   a non-transitory memory storage comprising instructions; and
   one or more processors in communication with the memory storage, wherein the one or more processors execute the instructions to:
      receive, from a network element, barring parameters,
      modify a non-service-related subset of the barring parameters associated with an access class barring type, and leaving unmodified a service-related subset of the barring parameters,
      forward, to a remote device, the modified non-service-related subset of the barring parameters and the unmodified service-related subset of the barring parameters;
      receive, from the remote device, a connection setup request;
      pass without checking any remote device service-related barring types;
      compare one or more relay device access class barring types against the non-service-related subset of the barring parameters as received from the network element; and
      determine whether to establish a connection with the network element in accordance with the comparison.

11. The relay device of claim 10, wherein the one or more relay device access class barring types comprise at least one of access class barring or enhanced access class barring.

12. The relay device of claim 10, wherein the barring parameters are included in system information blocks.

13. The relay device of claim 12, wherein at least a portion of the non-service-related subset of the barring parameters are included in at least one of a system information block type 2 (SIB2) or a system information block type 14 (SIB14).

14. The relay device of claim 13, wherein the non-service-related subset of the barring parameters is included in the SIB2, and wherein the one or more processors executing the instructions to modify the non-service-related subset of the barring parameters comprises the one or more processors executing the instructions to set an indication for at least one access class barring type to a false value.

15. The relay device of claim 13, wherein the non-service-related subset of the barring parameters is included in the SIB2, and wherein the one or more processors executing the instructions to modify the non-service-related subset of the barring parameters comprises the one or more processors executing the instructions to omit a field including an indication for at least one connection type.

16. The relay device of claim 13, wherein the non-service-related subset of the barring parameters is included in the SIB14, and wherein the one or more processors executing the instructions to modify the non-service-related subset of the barring parameters comprises the one or more processors executing the instructions to set a barring bitmap to indicate that the access class barring type is not barred.

17. The relay device of claim 16, wherein the one or more processors executing the instructions to modify the non-service-related subset of the barring parameters comprises the one or more processors executing the instructions to omit a per public land mobile network (PLMN) list of barring information.

18. The relay device of claim 10, wherein the any remote device service-related barring types comprises at least one of service specific access control, application-specific congestion control for data communications, or circuit switched fallback.

19. A method for performing access barring, the method comprising:
   receiving, by a relay device from a network element, barring parameters in system information blocks;
   modifying, by the relay device, a non-service-related subset of the barring parameters associated with a non-service-related access class barring type, and leaving unmodified a service-related subset of the barring parameters;
   forwarding, by the relay device to a remote device, the modified non-service-related subset of the barring parameters and the unmodified service-related subset of the barring parameters;
   receiving, by the relay device from the remote device, a connection setup request;
   passing without checking, by the relay device, any remote device service-related barring types;
   comparing, by the relay device, one or more relay device access class barring types against the non-service-related subset of the barring parameters as received from the network element; and
   determining, by the relay device, whether to establish a connection with the network element in accordance with the comparison.

20. The method of claim 19, wherein the non-service-related access class barring type comprises at least one of access class barring or enhanced access class barring.

21. The method of claim 19, wherein at least a portion of the barring parameters are included in at least one of a system information block type 2 (SIB2) or a system information block type 14 (SIB14).

* * * * *